(12) United States Patent
Fabian et al.

(10) Patent No.: US 9,782,998 B2
(45) Date of Patent: Oct. 10, 2017

(54) WHEEL ANTI-THEFT SYSTEM

(71) Applicant: FORD GLOBAL TECHNOLOGIES, LLC, Dearborn, MI (US)

(72) Inventors: Edgar Salazar Fabian, Cuautitlan Izcalli (MX); Jesus Guadalupe Castillo, Cuautitlan Izcalli (MX); Ricardo Hernandez, Atizapan de Zaratoga (MX); Francisco Javier Quintero Pèrez, Uruapan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 32 days.

(21) Appl. No.: 14/836,338

(22) Filed: Aug. 26, 2015

(65) Prior Publication Data

US 2017/0057282 A1    Mar. 2, 2017

(51) Int. Cl.
   *E05B 77/44*     (2014.01)
   *B60B 7/16*      (2006.01)
   *B60R 25/00*     (2013.01)
   *E05B 79/02*     (2014.01)

(52) U.S. Cl.
   CPC ............... *B60B 7/16* (2013.01); *B60R 25/00* (2013.01); *E05B 77/44* (2013.01); *E05B 79/02* (2013.01); *Y10T 70/585* (2015.04); *Y10T 70/5845* (2015.04)

(58) Field of Classification Search
   CPC .......... E05B 77/00; E05B 77/44; E05B 79/02; E05B 83/00; E05B 85/00; B60R 25/00; B60R 25/08; B60R 25/09
   See application file for complete search history.

(56) References Cited

U.S. PATENT DOCUMENTS

| | | | | |
|---|---|---|---|---|
| 2,124,035 A * | 7/1938 | Hurd | ...................... | B60B 23/06 292/6 |
| 2,340,998 A * | 2/1944 | Sundell | ................... | B60B 23/00 70/225 |
| 2,568,370 A * | 9/1951 | Scuderi | ..................... | B60B 3/18 301/35.52 |
| 2,614,889 A * | 10/1952 | Chandler | .................. | B60B 7/16 301/108.1 |
| 4,034,824 A * | 7/1977 | Lucas | ...................... | B60R 25/09 180/287 |
| 4,622,833 A * | 11/1986 | Shepherd | ................ | B60R 25/09 70/226 |
| 5,133,201 A * | 7/1992 | LaMott | ................... | B60R 25/09 188/265 |

(Continued)

FOREIGN PATENT DOCUMENTS

| | | |
|---|---|---|
| CN | 201235705 Y | 5/2009 |
| CN | 203543508 U | 4/2014 |

(Continued)

*Primary Examiner* — Christopher Boswell
(74) *Attorney, Agent, or Firm* — Jones Robb, PLLC; Raymond L. Coppiellie

(57) ABSTRACT

A vehicle wheel anti-theft system is disclosed. The system includes a plurality of lock actuators. Each lock actuator is configured to move between a locked state and an unlocked state. Each lock actuator includes a body portion extending along an axis of wheel rotation and at least one locking member configured to engage a portion of the wheel in a direction perpendicular to the axis of wheel rotation when in the locked state.

26 Claims, 6 Drawing Sheets

(56) References Cited

U.S. PATENT DOCUMENTS

| | | | | |
|---|---|---|---|---|
| 5,463,885 A | * | 11/1995 | Warren, Sr. | B60R 25/09 70/14 |
| 5,941,607 A | * | 8/1999 | Nordine | B60B 3/145 301/105.1 |
| 7,673,482 B2 | * | 3/2010 | Bosman | B60B 7/16 301/35.624 |
| 2014/0157841 A1 | | 6/2014 | Thomas et al. | |
| 2015/0136535 A1 | * | 5/2015 | Smeeton | B60R 25/09 188/69 |

FOREIGN PATENT DOCUMENTS

| | | |
|---|---|---|
| CN | 203793021 U | 8/2014 |
| CN | 203937430 U | 11/2014 |
| DE | 102007015447 A1 | 2/2008 |
| JP | 2012153211 A | 8/2012 |

* cited by examiner

WHEEL ANTI-THEFT SYSTEM

TECHNICAL FIELD

The present disclosure relates to wheel anti-theft systems and methods, and more particularly, anti-theft systems for wheels of motor vehicles.

BACKGROUND

Wheel anti-theft systems have been used in motor vehicles to deter and prevent theft of wheels. For example, wheel lug locks and other devices have been used to securely fasten wheels to lugs of a wheel hub. Although such systems and devices provide a degree of security, further improvements can be made because conventional anti-theft devices are typically exposed to some degree on an outer surface of a wheel. As a result, it is possible to access the anti-theft device and defeat the device, such as by breaking the device. In addition, some conventional anti-theft devices and systems are complex and expensive to manufacture and/or install. As a result, further improvements in the effectiveness and manufacturing efficiency of wheel anti-theft devices can be made.

SUMMARY

In accordance with various exemplary embodiments, the present disclosure provides a vehicle wheel anti-theft system. The anti-theft system comprises a wheel hub configured to be connected to a wheel of a vehicle by at least one fastener, and at least one lock actuator configured to be engaged with the wheel of the vehicle, wherein the at least one fastener and the at least one lock actuator each extend in an axial direction from the wheel hub and are each configured to be received in at least a portion of the wheel, wherein the at least one lock actuator extends through less than a full thickness of the wheel so as to be covered by an external front portion of the wheel when the wheel hub is fastened to the wheel.

In accordance with another aspect of the present disclosure, a vehicle wheel anti-theft system comprises a plurality of lock actuators each configured to move between a locked state and an unlocked state, each lock actuator comprising a body portion extending along an axis of wheel rotation and at least one locking member configured to engage a portion of the wheel in a direction perpendicular to the axis of wheel rotation when in the locked state.

In accordance with yet another aspect of the present disclosure, a vehicle wheel anti-theft system comprises a wheel hub configured to be connected to a wheel of a vehicle by at least one fastener, a brake rotor, and a lock actuator configured to be releasably lockingly received in the wheel of the vehicle, wherein the lock actuator extends from the wheel hub through an actuator hole of in the brake rotor and into a recess within the wheel when the system is assembled.

In accordance with a further aspect of the present disclosure, a motor vehicle is provided. The motor vehicle comprises a wheel hub, a wheel, wherein at least one fastener connects the wheel to the wheel hub, and a lock actuator configured to be received in the vehicle wheel and to releasably lockingly engage the wheel, wherein the lock actuator extends from the wheel hub into a portion of a thickness of the wheel, such that the lock actuator is covered by an external portion of the wheel.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the invention are explained in detail below using an exemplary embodiment illustrated in the following figures. In the figures.

DESCRIPTION OF THE EMBODIMENTS

Figure 1:
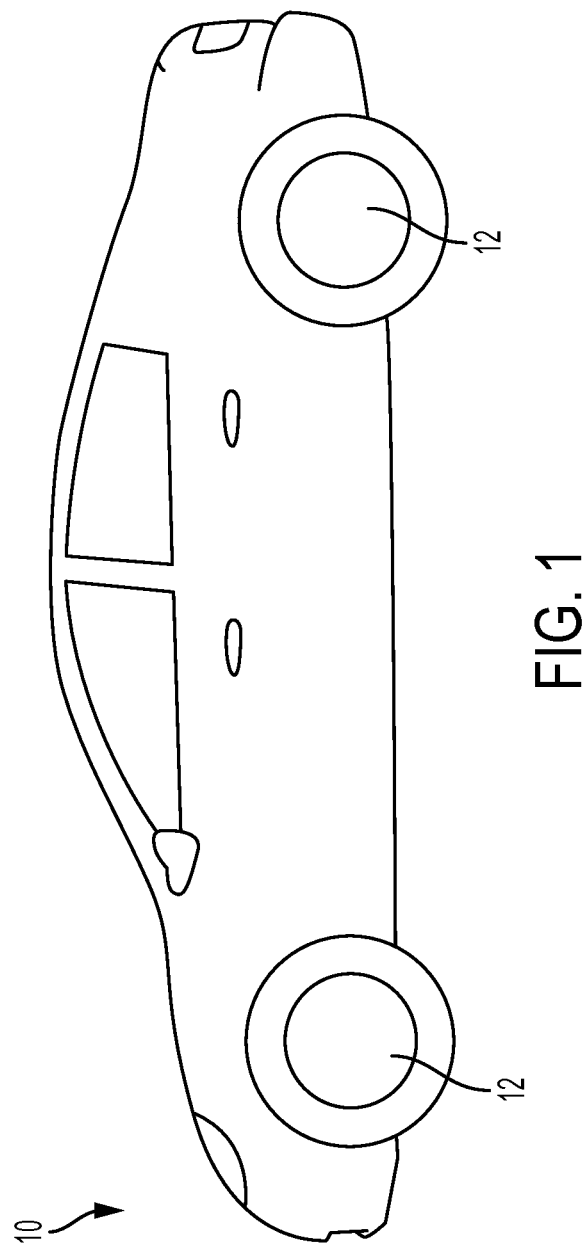
FIG. 1 schematically depicts a side view of a motor vehicle, according to an exemplary embodiment.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the disclosed subject matter.

The various exemplary embodiments described herein contemplate wheel anti-theft systems and methods. A vehicle wheel anti-theft system may include a wheel hub and a lock actuator. The wheel hub may be configured to be connected to a wheel of a vehicle by at least one fastener connected to the wheel hub and the lock actuator may be configured to be fastened to a wheel the vehicle, such that the lock actuator extends from the wheel hub in a location that will be covered by a portion of the wheel in a mounted state of the wheel to the wheel hub. The lock actuator may extend from the wheel hub in a location such that the lock actuator is configured to extend through an actuator hole of a brake rotor, in a state of the brake rotor being mounted to the wheel hub. When the wheel is in the mounted state, the lock actuator is covered by the portion of the wheel so that the lock actuator is not exposed or accessible on a front surface of wheel. The anti-theft system may include a plurality of lock actuators and a plurality of fasteners, with a lock actuator being located in between pairs of the fasteners, such as along a circumferential direction of the wheel hub.

The lock actuator may comprise one or more locking members configured to extend into one or more corresponding pockets in a wheel. The locking members may be configured to move along a radial direction with respect to a longitudinal axis of the lock actuator. A shaft of the lock actuator may be configured to exert a force upon the locking members, causing the locking members to be retracted from the corresponding pockets when the lock actuator is in an unlocked state. The lock actuator may include an actuator to move the shaft and a biasing device configured to urge the shaft to a locked position in which the locking members are received in the corresponding pockets. The anti-theft system may include a controller in signal communication with the lock actuator that is configured to control the lock actuator, such as to place the lock actuator in a locked state or an unlocked state.

Figure 2:
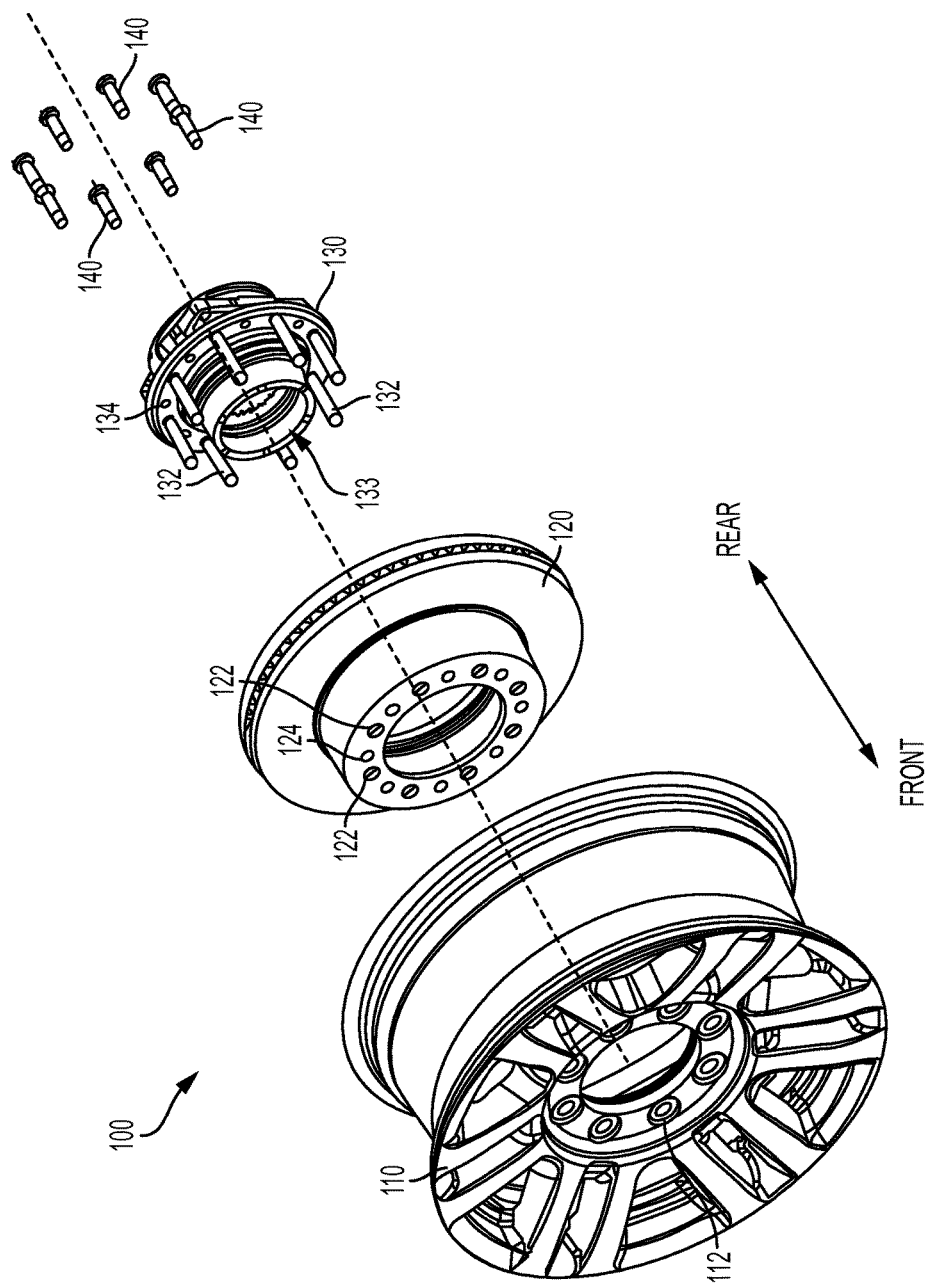
FIG. 2 is an exploded view of a wheel lock mount assembly, according to an exemplary embodiment.

Turning to FIG. 1, a motor vehicle 10 is schematically depicted, according to an exemplary embodiment. Motor vehicle 10 may include a plurality of wheels 12. Wheels 12 may include a lock mount assembly to minimize or prevent theft of wheels 12 from motor vehicle 10. FIG. 2 depicts an exploded view of a wheel lock mount assembly 100 in accordance with the present teachings. Wheel lock mount assembly 100 includes a wheel 110, brake rotor 120, wheel hub 130, and one or more lock actuators 140, according to an exemplary embodiment. Wheel hub 130 may be connected to an axle (not shown) of a motor vehicle and may include a plurality of fasteners 132 (e.g., bolts, screws, or other types of fasteners familiar to one of ordinary skill in the art) to secure wheel 110 to hub 130, with the fasteners 132 being located radially outward from and evenly spaced around a central aperture 133 of wheel hub 130. Wheel 110 may include fastener holes 112 configured to receive fasteners 132, the number of fastener holes 112 corresponding to the number of fasteners 132. Fasteners 132 extend through fastener holes 112 to a front side of wheel 110 so that fasteners (not shown), such as nuts or other fasteners familiar to one of ordinary skill in the art, may be attached to fasteners 132 to connect wheel 110 to hub 130. Brake rotor 120 also may be connected to wheel 110 and hub 130, such as by locating brake rotor 120 between wheel 110 and hub 130 and extending fasteners 132 through fastener holes 122 of brake rotor 120 and fastener holes 112 of wheel 110.

To provide a locking capability, wheel lock mount assembly 100 includes one or more lock actuators 140. As depicted in FIG. 2, lock actuators 140 may extend through hub 130, for example via actuator holes 134 of hub 130, and through brake rotor 120, via actuator holes 124 of brake rotor 120, to engage wheel 110. For example, lock actuators 140 may engage and lock with an inner (e.g., rear) side of wheel 110.

As shown in the exemplary embodiment of FIG. 2, wheel 110 does not include holes for lock actuators 140 on a front side of wheel 110, like holes 112 for fasteners 132; that is, there are no through holes in wheel 110 configured to receive lock actuator(s) 140. As a result of the lock actuators 140 not extending through wheel 110 to a front surface of wheel 110, lock actuators 140 are not accessible from a front side of wheel 110, and therefore, lock actuators 140 cannot be removed or broken on a front side of the wheel 110 via tools. In addition, lock actuators 140 are not used to engage with, or otherwise lock, fasteners 132, as in conventional wheel lock systems, but instead are configured to directly engage with and lock wheel 110. As shown in the exemplary embodiment of FIG. 2, lock actuators 140 may be positioned such that they alternate with fasteners 132 around a circumference of hub 130, with lock actuators 140 and fasteners 132 extending parallel to one another but separate from (e.g., spaced apart from) and independent of each other. For instance, lock actuators 140 and fasteners 132 may be uncoupled from one another (e.g., lock actuators 140 are not used to secure fasteners 132). Thus, even if the fasteners 132 are broken or otherwise disabled, the lock actuators 140 still may function to lock wheel 110 by directly engaging wheel 110 without involvement of fasteners 132.

Figure 3:
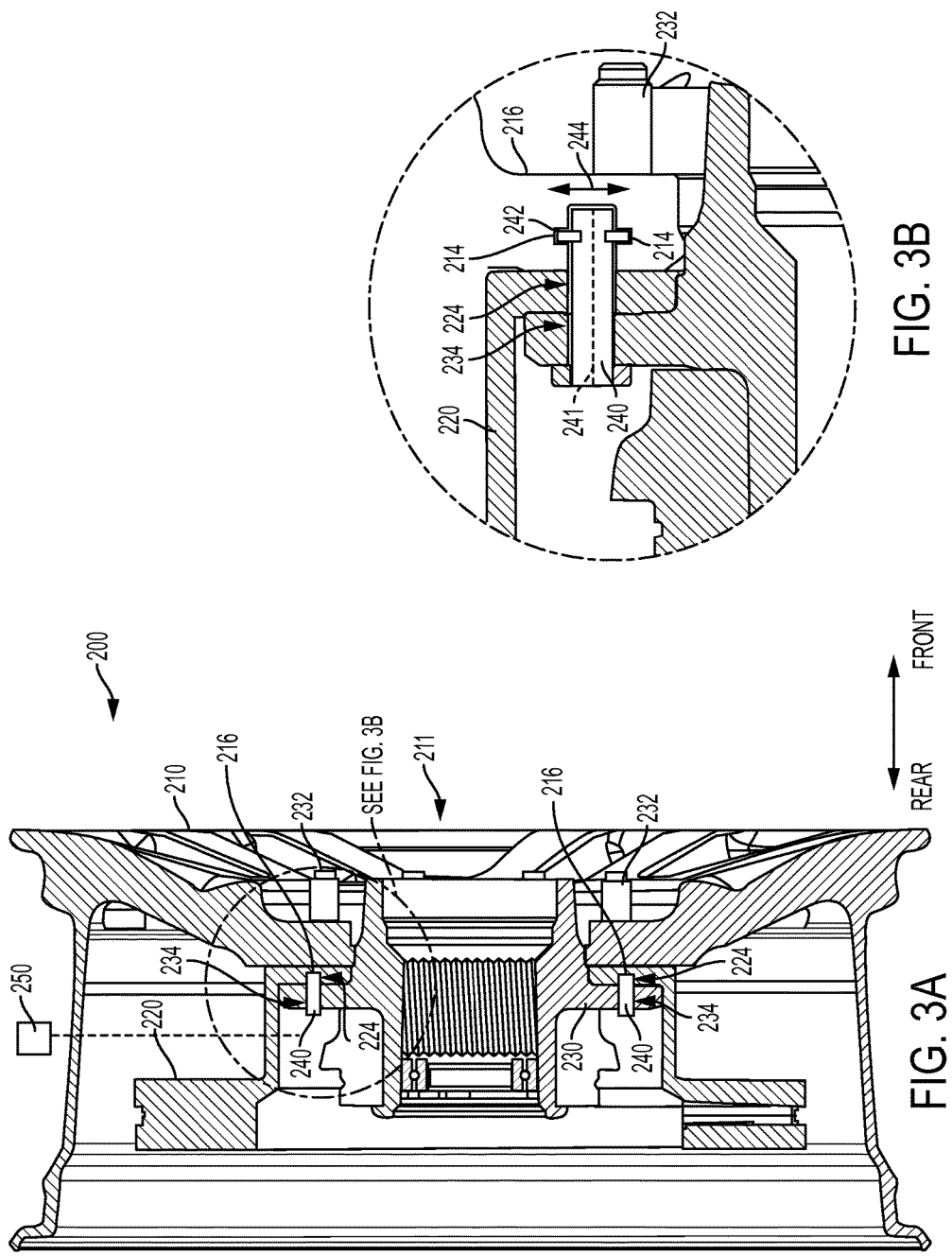
FIG. 3A is a side sectional view of a wheel lock mount assembly, according to an exemplary embodiment.
FIG. 3B is an enlarged view of a portion of the wheel lock mount assembly of FIG. 3A.

Turning to FIG. 3A, a side sectional view of a wheel anti-theft system 200 is depicted, according to an exemplary embodiment. Wheel anti-theft system 200 may include a wheel 210, a brake rotor 220, a wheel hub 230, and one or more lock actuators 240, as described with regard to the exemplary embodiment of FIG. 2. As described above with regard to the exemplary embodiment of FIG. 2, fasteners 232 of wheel hub 230 may extend through brake rotor 220 and fastener holes (not depicted in FIG. 3A) of wheel 210 and be exposed on a front side of wheel 210 so that fasteners (not depicted) may be attached to fasteners 232 to secure wheel 210 to hub 230.

One or more lock actuators 240 may extend through actuator holes 234 of wheel hub 230 and actuator holes 224 brake rotor 220 and into wheel 210 (see also enlarged portion in FIG. 3B), as discussed above with regard to the embodiment of FIG. 2. As depicted in FIG. 3B, lock actuators 240 may completely extend through wheel hub 230 (e.g., from one side through wheel hub 230 to the opposite side). In accordance with the present teachings, the lock actuators 240 extend through only a portion of the thickness of wheel 210 (e.g., along an axial or a rear-to-front direction in FIG. 3A) such that forward locking ends of the lock actuators terminate within the thickness of the wheel 210 and are not exposed or accessible on a front surface 211 of wheel 210. The front surface 211 of wheel 210 may correspond to a lateral side of a motor vehicle when wheel 210 is mounted on the vehicle, as depicted in FIG. 1. For example, at least a portion 216 of wheel 210 covers a lock actuator 240 with respect to a front face 211 of wheel 210. Wheel portion 216 may form a portion of front face 211 of wheel 210 that covers lock actuator 240 when wheel 210 is mounted to wheel hub 230. For instance, actuator holes (e.g., actuator holes 234) of wheel hub 230 may have locations corresponding to wheel portions 216 that cover the lock actuators 140. The wheel portions 216 may be portions of a hub portion of a wheel, as will be discussed below with regard to the exemplary embodiment of FIG. 4. Thus, the lock actuator 240 is covered by the wheel portion 216, which may be a solid portion of metal when wheel 210 is made of a metal. As a result, the lock actuator 240 is hidden and protected by the wheel portion 216. Therefore, the one or more lock actuators 240 may be covered by wheel portions 216 so the lock actuators 240 are not exposed or accessible on the front surface 211. Even if the fasteners 232 are broken or disabled, such as by removing fasteners (e.g., nuts) from fasteners 232, removal of wheel 210 is minimized or prevented when lock actuators 240 are in a locked state and engaged with wheel 210.

As depicted in the exemplary embodiment of FIG. 3A, a wheel lock system including wheel anti-theft system 200 may further include a controller 250 operatively coupled to (e.g., in signal communication with) one or more lock actuators 240. According to an exemplary embodiment, the lock actuators 240 also may be coupled to a power source (not shown), such as the electrical system (e.g., alternator and/or battery) of the motor vehicle, to provide power used to actuate lock actuators 240. Controller 250 may control the actuation of lock actuators 240, such as by sending signals to move the actuators 240 between an unlocked state and a locked state. As shown in FIG. 3B, a lock actuator 240 may include locking members 242 configured, for example, as locking fingers, locking pins, or other suitable structures, to engage with wheel 210. In one exemplary embodiment, locking members 242 may be configured to move in the directions indicated by arrows 244 during locking and unlocking of lock actuator 240. For example, locking member 242 may radially extend from or extend in a direction perpendicular to, lock actuators 240, to move or extend into pockets 214 of wheel 210 when locking actuator 240 is placed in a locked state. Similarly, locking members 242 may retract or withdraw along directions indicated by arrows 244 (e.g., into lock actuator 240) when moved into an unlocked state. The directions indicated by arrows 244 may be, for example, a radial direction, which may be substantially perpendicular with respect to a longitudinal axis 241 of lock actuator 240.

Controller 250 may be activated to send signals to lock or unlock lock actuators 240 via, for example, a wireless remote keyless access device for a motor vehicle (e.g., a remote keyless access device carried by a user of a motor vehicle to unlock the motor vehicle), a user input device in the vehicle (e.g., a user interface in the dashboard of the vehicle, such as a screen and user input device to access various screen and input commands), or other device or system familiar to one of ordinary skill in the art. According to an exemplary embodiment, controller 250 may require a code to enable and/or disable lock actuators 240, such as, for example, a code stored in the electronic memory of a wireless remote keyless device carried by a user or a code a user must input into the user input device to match a corresponding code stored in an electronic memory accessible to controller 250. Additionally or alternatively, in accordance with another exemplary embodiment, controller 250 may be configured to automatically actuate the one or more lock actuators 240 to be placed in a locked state upon shutdown of a motor vehicle.

The configuration of controller 250 may be subject to a variety of implementation-specific variations. For example, in some embodiments, the functions described in reference to controller 250 may be performed across multiple control units or among multiple components of a single controller. Further, controller 250 may include one or more structural components (e.g., microprocessors) that provide the function of a controller. Any controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, for example, for controlling components of a brake system actuator, such as controlling a valve of the actuator based on feedback received from another component of the vehicle.

The present disclosure contemplates wheel anti-theft systems that include various numbers of lock actuators. For example, one, two, three, four, five, six, seven, eight, nine, ten, or more lock actuators may be used in a wheel anti-theft system. According to an exemplary embodiment, the number of lock actuators used to secure a wheel corresponds to the number of fasteners used to mount the wheel.

FIGS. 4-7 depict various configurations of lock actuators for wheel anti-theft systems, with the systems including different numbers of lock actuators, which may be configured according to the various exemplary embodiments described herein. In FIGS. 4-7 the positions of both fasteners and lock actuators are depicted for illustrative purposes, but it should be understood that the lock actuators would be covered and hidden by portions of the wheel, as discussed above with regard to the exemplary embodiment of FIGS. 3A and 3B. Therefore, lock actuators (340, 440, 540, and 640) in FIGS. 4-7 have been depicted with dashed lines to indicate that the lock actuators are covered by at least portions of the wheels.

Figure 4:
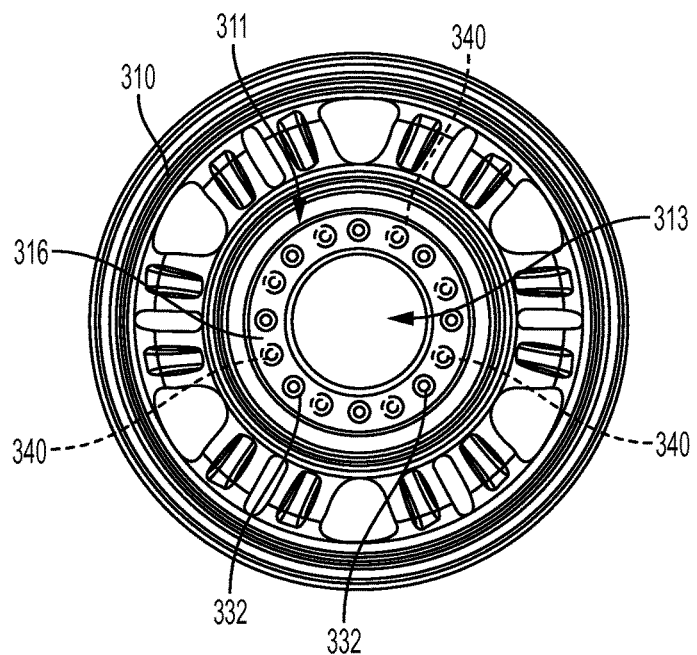
FIG. 4 is a rear view of a wheel and locations of lock actuators in the wheel, according to an exemplary embodiment.

FIG. 4 depicts a front view of a front surface 311 of a wheel 310 that is mounted via fasteners 332 and is engaged with lock actuators 340. Lock actuators 340 may be covered by at least a portion 316 of wheel 310, as discussed above with regard to FIGS. 3A and 3B. The wheel portion 316 may be a part of a hub portion of wheel 310 through which the fasteners 332 extend and which extends around central aperture 313 in a circumferential direction. As shown in the exemplary embodiment of FIG. 4, a lock actuator 340 may be located in between pairs of fastener 332, such as along a circumferential direction about a central aperture 313 of wheel 310, or along a circumference of wheel hub 330 (e.g., radially spaced away from central aperture 313 and alternatingly spaced with fasteners 332 around central aperture 313). Thus, each lock actuator 340 may be separate (e.g., spaced apart) and independent from the fasteners 332. As shown in the exemplary embodiment of FIG. 4, eight fasteners 332 and eight lock actuators 340 may be used in the wheel anti-theft system for wheel 310. Although described as having a 1:1 ratio of actuators to fasteners, it is not necessary that the number of actuators and fasteners be the same. As will be understood by those of ordinary skill in the art, the number, size, type of actuators may vary, and the corresponding number of fasteners provided will be such that a balance of the wheel is not affected. Further, the actual number of actuators, as well as their size and type, may be selected based on several factors such as size, weight, cost, packaging, etc., as will be understood by those of skill in the art.

Figure 5:
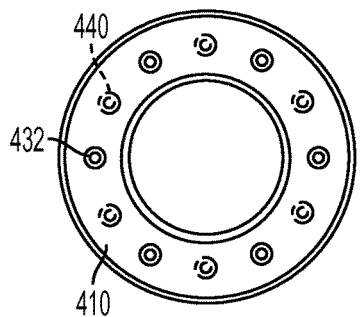
FIG. 5 is a front view of a wheel and locations of lock actuators in the wheel, according to another exemplary embodiment.
Figure 6:
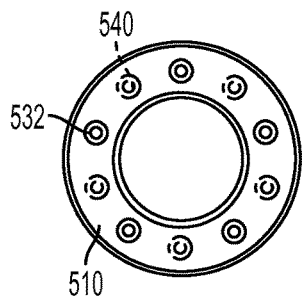
FIG. 6 is a front view of a wheel and locations of lock actuators in the wheel, according to another exemplary embodiment.
Figure 7:
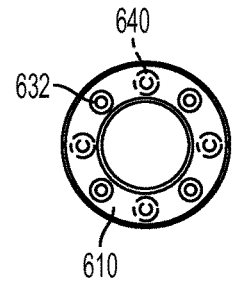
FIG. 7 is a front view of a wheel and locations of lock actuators in the wheel, according to another exemplary embodiment.

FIG. 5 depicts a wheel 410 similar to the exemplary embodiment of FIG. 4, except that wheel 410 includes six fasteners 432 and six lock actuators 440. FIG. 6 depicts a wheel 510 that includes five fasteners 532 and five lock actuators 540 and FIG. 7 depicts a wheel 610 that includes four fasteners 632 and four lock actuators 440. The present disclosure contemplates other wheel configurations, such as wheels that include other numbers of fasteners and lock actuators, including wheel configurations in which the number of fasteners and lock actuators do no correspond (e.g., do not equal each other).

The lock actuators of the various exemplary embodiments described herein may be configured to be in a locked state when power is not supplied to the lock actuator. As a result, the lock actuators may remain in a locked state without requiring power, which minimizes or eliminates theft of a wheel when a motor vehicle including the wheel anti-theft system is shut down and one or more lock actuators used to lock a wheel do not receive power.

Figure 8:
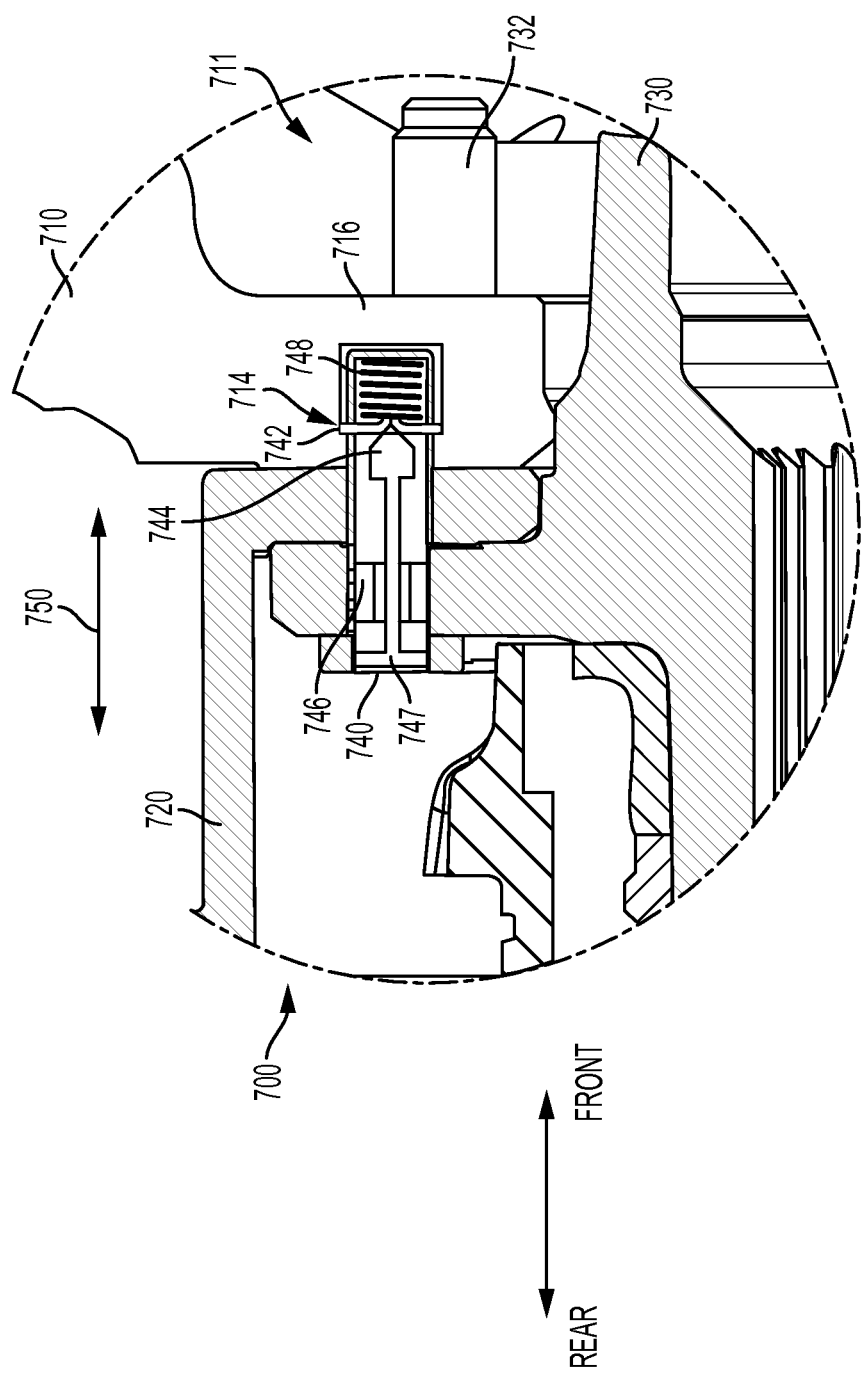
FIG. 8 is a side sectional view of a portion of the wheel lock mount assembly in a locked state, according to an exemplary embodiment.

Turning to the exemplary embodiment of FIG. 8, a sectional view is shown of a wheel anti-theft system 700. System 700 is configured to work with wheel 710, brake rotor 720, and wheel hub 730, with rotor 720 and hub 730 being fastened to wheel 710 via one or more fasteners 732. System 700 further includes one or more lock actuators 740 configured to releasably engage with and/or lock to wheel 710. Wheel anti-theft system 700 may further include a controller (not shown) to control the lock actuators 740, similar to controller 250 described above with regard to the exemplary embodiment of FIGS. 3A and 3B. The lock actuators 740 extend through only a portion of the thickness of wheel 710, as described above with regard to the exemplary embodiment of FIGS. 3A and 3B, so that lock actuators 740 are not exposed or accessible on a front surface 711 of wheel 710. For example, at least a portion 716 of wheel 710 covers a lock actuator 740 with respect to a front face 711 of wheel 710.

Lock actuator 740 includes one or more locking members 742 (e.g., fingers or pins) configured to extend into one or more corresponding pockets 714 of wheel 710 when lock actuator 740 is in a locked state, as depicted in the exemplary embodiment of FIG. 8. The pockets 714 may have various configurations, such as, for example, a pocket having substantially the same shape and size as a locking member 742, a single pocket (e.g., groove or recess with a shoulder to bear against a locking member 742) extending about a periphery of lock actuator, or other pocket shapes used to receive a locking member. In the exemplary embodiment of FIG. 8, lock actuator 740 further includes a shaft 744, a shaft actuator 746 configured to actuate shaft 744, and a biasing device 748 (e.g., a coil spring, other type of spring, or other biasing member) configured to bias shaft 744 to the locked state shown in FIG. 8. Shaft actuator 746 may be, for example, a solenoid that receives electrical power to produce a magnetic field to actuate shaft 744 along the rear-to-front axial wheel direction depicted in FIGS. 8 and 9, a piston cylinder connected to shaft 744, or other actuator familiar to one of ordinary skill in the art for actuating a shaft. In the locked state depicted in FIG. 8, shaft actuator 746 is not active (e.g., not powered), permitting biasing device 748 to bias shaft 744 in a rearward direction to the position shown in FIG. 8. According to an exemplary embodiment, biasing device 748 may also contact the one or more locking members 742 to bias the locking members 742 into a locked position in which locking members 742 are received in the corresponding pockets 714. For example, biasing device 748 may press against the locking members 742 to push the locking members 742 into the pockets 714 and also press against shaft 744 to move shaft to the rearward position shown in FIG. 8.

Figure 9:
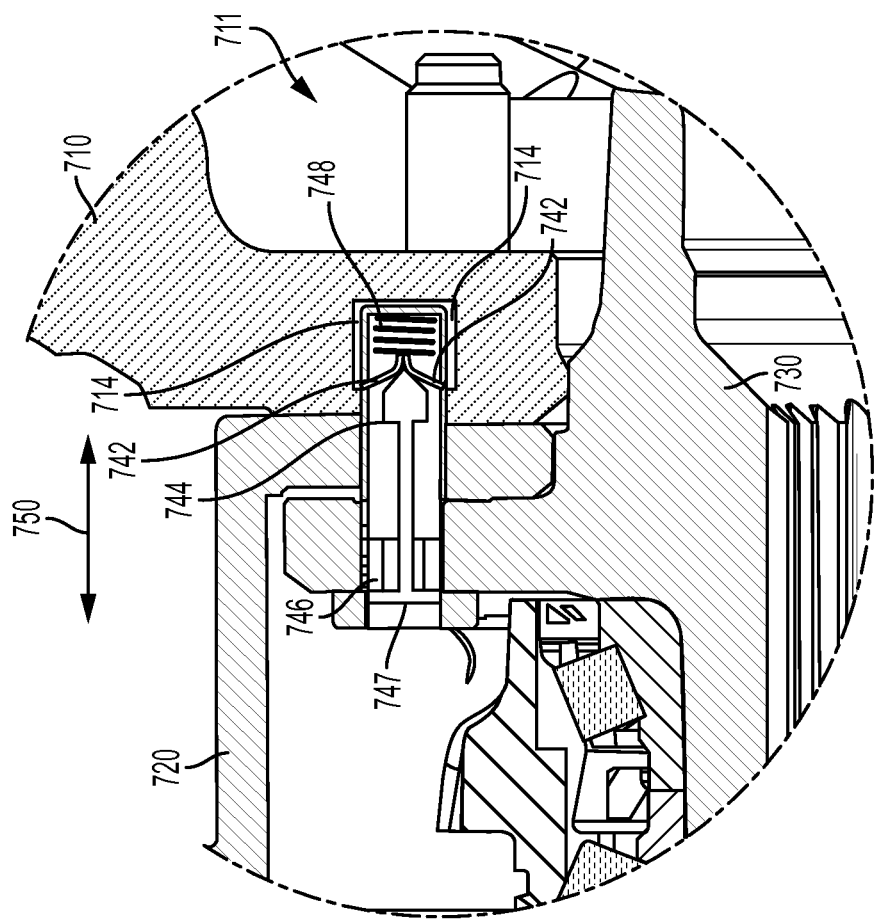
FIG. 9 depicts the wheel lock mount assembly of FIG. 8 in an unlocked state.

FIG. 9 depicts wheel anti-theft system 700 in an unlocked state. An unlocked state may occur, for example, due to shaft actuator 746 being activated by the controller (e.g., controller issuing a command to activate shaft actuator 746, such as a command to provide power to shaft actuator 746). Shaft actuator 746 causes shaft 744 to move towards the front face 711 of wheel 710 with a greater force that the force exerted by biasing device 748, causing shaft 744 to press against the one or more locking members 742 and compress biasing device 748. As a result, locking members 742 are retracted from the corresponding pockets 714 and the wheel 710 is unlocked. According to an exemplary embodiment, shaft 744 may include a flange 747 or other protrusion to contact a stop, such as shaft actuator 746, to arrest movement of shaft 744 at the unlocked position.

Due to the configuration of wheel anti-theft system 700, lock actuator 740 passively places wheel 710 in a locked state when lock actuator 740 (e.g., shaft actuator 746) is not activated (e.g., is unpowered). Therefore, wheel anti-theft system 700 does not require power, such as from the electrical system of a vehicle (e.g., battery), to maintain a locked state with wheel 710 but may be simply activated to unlock the wheel 710, such as via a command from a controller.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed:

1. A vehicle wheel anti-theft system, comprising:
   a wheel hub configured to be connected to a wheel of a vehicle by at least one fastener; and
   at least one lock actuator configured to be engaged with the wheel of the vehicle;
   wherein the at least one fastener and the at least one lock actuator each extend in an axial direction from the wheel hub and are each configured to be received in at least a portion of the wheel, wherein the at least one lock actuator extends through less than a full thickness of the wheel so as to be covered by an external front portion of the wheel when the wheel hub is fastened to the wheel.

2. The vehicle wheel anti-theft system of claim 1, wherein the at least one lock actuator is unconnected to and independent of the at least one fastener.

3. The vehicle wheel anti-theft system of claim 1, further comprising a plurality of lock actuators and a plurality of fasteners, wherein the lock actuators and fasteners are alternatingly position around a circumference of a central aperture of the wheel hub.

4. The vehicle wheel anti-theft system of claim 1, wherein the at least one lock actuator comprises at least one locking member configured to extend into one or more corresponding pockets in the wheel.

5. The vehicle wheel anti-theft system of claim 4, wherein the at least one locking member is configured to move into a position perpendicular to a longitudinal axis of the lock actuator.

6. The vehicle wheel anti-theft system of claim 4, wherein the lock actuator further comprises a shaft configured to retract the at least one locking member from the corresponding pockets when the lock actuator is in an unlocked state.

7. The vehicle wheel anti-theft system of claim 6, wherein the lock actuator further comprises an actuator to move the shaft to exert a force upon the at least one locking member when the lock actuator is in the unlocked state.

8. The vehicle wheel anti-theft system of claim 6, wherein the lock actuator further comprises a biasing device configured to urge the shaft to a locked position so the at least one locking member is received in the corresponding pockets.

9. The vehicle wheel anti-theft system of claim 1, further comprising a controller in signal communication with the lock actuator and configured to control the lock actuator.

10. The vehicle wheel anti-theft system of claim 1, wherein the at least one lock actuator includes four or more of the lock actuators.

11. A vehicle wheel anti-theft system, comprising:
    a plurality of lock actuators each configured to move between a locked state and an unlocked state, each lock actuator comprising a body portion and at least one locking member configured to move from a retracted configuration to an extended configuration to engage a portion of the wheel in a direction perpendicular to the axis of wheel rotation when in the locked state.

12. The system of claim 11, further comprising a wheel hub, wherein each of the plurality of lock actuators extends through a thickness of the wheel hub in parallel with the axis of wheel rotation.

13. The system of claim 12, further comprising a plurality of fasteners extending from the wheel hub, wherein each of the plurality of fasteners extends parallel to each of the plurality of lock actuators and is configured to extend through a thickness of the wheel.

14. The system of claim 11, wherein each of the plurality of lock actuators is configured to pass through only a portion of a thickness of the wheel, such that each of the plurality of lock actuators is positioned behind an exterior front surface of the wheel.

15. The system of claim 14, wherein the at least one locking member of each of the plurality of lock actuators is configured to be received in a locking aperture of the wheel.

16. The system of claim 11, wherein a longitudinal axis of the at least one locking member, when in the retracted configuration, is substantially parallel to a longitudinal axis of the body portion of the lock actuator.

17. The system of claim 11, wherein a longitudinal axis of the at least one locking member changes orientation with respect to a longitudinal axis of the body portion of the lock actuator as the at least one locking member moves between the retracted configuration and extended configuration.

18. A vehicle wheel anti-theft system, comprising:
    a wheel hub configured to be connected to a wheel of a vehicle by at least one fastener;
    a brake rotor;
    a lock actuator configured to be releasably lockingly received in the wheel of the vehicle; and
    a controller configured to remotely actuate movement of the lock actuator between a locked configuration and an unlocked configuration,
    wherein the lock actuator extends from the wheel hub through an actuator hole of in the brake rotor and into a recess within the wheel when the system is assembled.

19. The system of claim 18, wherein the lock actuator extends completely through the wheel hub.

20. The system of claim 18, wherein the lock actuator comprises one or more locking members configured to extend into one or more corresponding pockets in the wheel.

21. The system of claim 20, wherein a longitudinal axis of the lock actuator extends parallel to an axis of wheel rotation, and where the one or more locking members are configured to move relative to the longitudinal axis of the lock actuator such that a longitudinal axis of the one or more locking members are perpendicular to the axis of wheel rotation when in the locked state.

22. The system of claim 20, wherein the lock actuator further comprises:
a shaft to which the one or more locking members are movably connected;
a biasing member configured to bias the one or more locking members in a locked position; and
an actuator configured to move the shaft to retract the one or more locking members from the locked position when the lock actuator is in the unlocked state.

23. The system of claim 18, wherein the controller is in signal communication with the lock actuator and is configured to automatically control the lock actuator.

24. A motor vehicle, comprising:
a wheel hub;
a wheel, wherein at least one fastener connects the wheel to the wheel hub; and
a lock actuator configured to be received in the wheel and to releasably lockingly engage the wheel;
wherein the lock actuator extends from the wheel hub into a portion of a thickness of the wheel, such that the lock actuator is covered by an external portion of the wheel.

25. The motor vehicle of claim 24, further comprising a brake rotor located between the wheel and the wheel hub, wherein the lock actuator extends through the brake rotor.

26. The motor vehicle of claim 24, wherein the lock actuator includes at least four lock actuators, and wherein the at least one fastener includes at least four fasteners, wherein the lock actuators and the fasteners are radially spaced from a central aperture of the hub and are alternatingly positioned around a circumference of the central aperture.

* * * * *